(12) United States Patent
Parthasarathy et al.

(10) Patent No.: US 7,165,161 B2
(45) Date of Patent: Jan. 16, 2007

(54) METHODS AND APPARATUS FOR BALANCING MEMORY ACCESS LATENCY AND BANDWIDTH

(75) Inventors: Balaji Parthasarathy, Phoenix, AZ (US); David Smiley, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 10/731,996

(22) Filed: Dec. 9, 2003

(65) Prior Publication Data
US 2005/0125620 A1    Jun. 9, 2005

(51) Int. Cl.
*G06F 12/00* (2006.01)
*G06F 12/06* (2006.01)
(52) U.S. Cl. ...................... 711/170; 711/167
(58) Field of Classification Search ........... 711/170, 711/167
See application file for complete search history.

(56) References Cited

U.S. PATENT DOCUMENTS 6,378,049 B1 * 4/2002 Stracovsky et al. ......... 711/147
2002/0052798 A1 * 5/2002 Nishikado et al. ............ 705/26

* cited by examiner

*Primary Examiner*—Matthew Kim
*Assistant Examiner*—Lev Iwashko
(74) *Attorney, Agent, or Firm*—Ted A. Crawford

(57) ABSTRACT

A method and apparatus for balancing memory access latency and bandwidth is generally described. In accordance with one example embodiment of the invention, a method comprising determining at least one characteristic of a memory request, and selectively leaving an accessed memory page open after a memory access based, at least in part, on the at least one characteristic for the memory request, to balance memory access latency and bandwidth of a subsequent memory request(s).

40 Claims, 4 Drawing Sheets

METHODS AND APPARATUS FOR BALANCING MEMORY ACCESS LATENCY AND BANDWIDTH

TECHNICAL FIELD

Embodiments of the present invention generally relate to the field of electronic systems, and more particularly, to methods and apparatus for balancing memory access latency and bandwidth.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Figure 1:
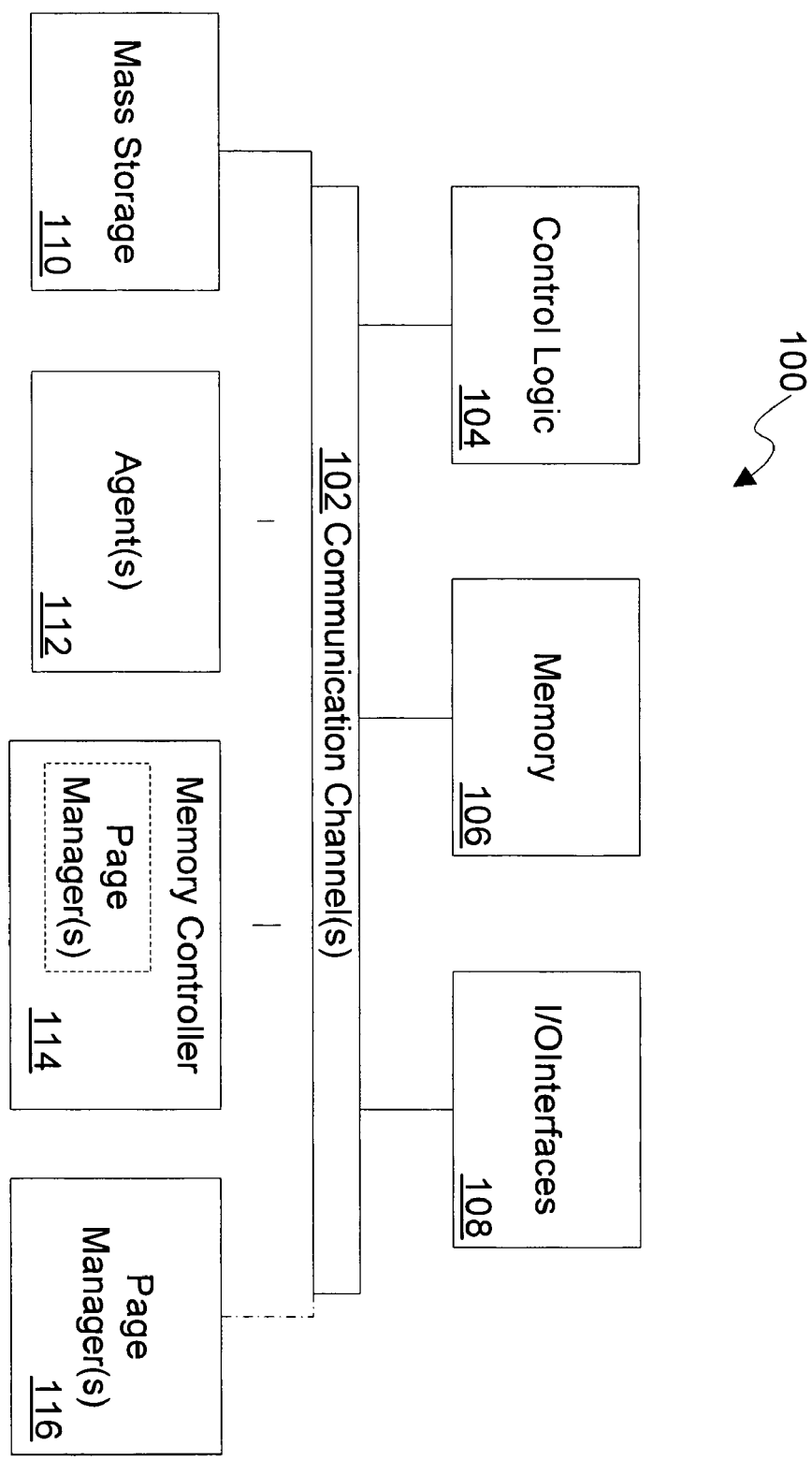
FIG. 1 is a block diagram of an electronic system incorporating the teachings of the present invention, according to but one example embodiment of the invention.

Embodiments of the present invention are generally directed to methods and apparatus for balancing memory access latency and bandwidth. In accordance with one example embodiment, a page manager, associated with a memory controller, is introduced herein. As described more fully below, the innovative page manager is operable to determine at least one characteristic of a memory request. Based, at least in part, on the at least one characteristic the page manager may selectively leave an accessed memory page open after a memory access to balance memory access latency and bandwidth of a subsequent memory request(s). By balancing memory access latency and bandwidth, the page manager may effectively increase the memory access bandwidth, albeit at the cost of memory access latency, or vice versa.

According to one embodiment, the page manager may make the determination either statically, i.e. at time of start-up, or dynamically, i.e. during run-time, and based on that determination, selectively leave an accessed memory page open after a memory access.

Those skilled in the art will appreciate that the introduction of the page manager overcomes the pre-configured, static nature of conventional memory controllers. That is, whereas conventional memory controllers were manufactured to be either page-open, or page-closed memory controllers, they were incapable of balancing memory bandwidth and memory access latency.

In an example embodiment, the page manager balances memory access latency and bandwidth. By balancing memory access latency and bandwidth, the page manager may increase memory access bandwidth with the cost of increased memory access latency.

In the context of at least one embodiment, the memory being accessed may be a form of memory organized as an array of memory elements addressable by specifying a bank and row address. As used herein, a "memory page" may be referred to as a specific combination of the bank and row addresses, although the invention is not limited in this regard.

In accordance with one example embodiment, when a memory request is made corresponding to a particular memory page, content relevant to the memory request may become accessible. In order to become accessible a memory page may be opened. The opening of the memory page may involve a series of steps to activate the memory page and allow for physical access to the memory page, although the invention is not limited in this regard.

In an example implementation, if a subsequent memory request is on the same memory page, this may be deemed as a "page hit." When a page hit occurs, the page manager may leave the accessed memory page open after memory access. Since leaving the memory page open after memory access may eliminate the need to complete the steps to activate the memory page before memory access is possible for subsequent memory requests, memory access bandwidth may be increased.

In another example implementation, if a subsequent memory request is not on the same memory page as the previous memory access, this may be deemed as a "page miss." Because additional steps are required to deactivate or close a memory page and then open or activate a new memory page before the subsequent memory access can occur, leaving the memory page open after the memory access may serve to increase memory access latency when a page miss occurs.

Furthermore, memory access latency may be reduced if a memory page is closed after a memory access. By closing the memory page after a memory access, a subsequent memory request(s) may only require the opening of a new memory page before memory access may occur. However, closing the memory page after a memory access may reduce the memory access bandwidth. Therefore, memory access latency and bandwidth may be balanced by closing a memory page after memory, although the invention is not limited in this regard.

In accordance with an example embodiment, a characteristic of a memory request may be determined, based at least in part, on the spatial and/or temporal locality of a memory request.

In an example implementation, the page manager may balance memory access latency and bandwidth by closing a memory page after memory access, based at least in part, on a low spatial and/or temporal locality characteristic. A low spatial locality characteristic may exist if the probability of access to the same memory page is low or none for a memory request, although the invention is not limited in this regard. A low temporal locality characteristic may exist if the probability of access to the same memory page within at least a subset of subsequent accesses is low or none, although the invention is not limited in this regard.

In another example implementation, the page manager may increase memory bandwidth by leaving a memory page open where memory accesses may have a high spatial and temporal locality characteristic, although the invention is not limited in this regard.

In an example embodiment, a characteristic of a memory request may be determined, based at least in part, on the type of application environment. As explained in more detail below, types of application environments may include, for example, environments where large amounts of data with a high correlation to each other are moved between different elements of an electronic system and page hits are common, environments where a large number of packets of data are handled with little or no correlation to each other and page misses are common, or environments containing a mixture of these two environments, although the invention is not limited in this regard.

In accordance with an example embodiment, a characteristic of a memory request may be determined dynamically using a memory request queue. The memory request queue may be organized based, at least in part, on at least a subset of pending memory requests, although the invention is not limited in that regard.

In an example implementation, the queue may be specific to a particular agent, a type of memory request, i.e. instruction or data, an application environment or sorted for each bank of memory, although the invention is not limited in this regard.

In another example implementation, a queue may be generic for multiple agents, or from a single agent through multiple virtual ports. Multiple agents may be inside an application specific integrated chip (ASIC) designed for a particular application environment and may be communicatively coupled through an internal communication channel or multiple agents may be different integrated chips communicatively coupled in an electronic system.

In an example implementation, the page manager may utilize the queue to dynamically determine a memory request characteristic. The page manager may compare a memory request to at least a subset of pending memory requests organized in the queue. The page manger, based at least in part, on the comparison, may determine at least one characteristic of the memory request, although the invention is not limited in this regard.

In accordance with an example embodiment, a characteristic of a memory request may be determined by the use of a page management indicator associated with at least a subset of memory requests. The page management indicator characteristic may be determined by a page manager based at least in part on a range of criteria such as the type of memory request expected from a particular agent, the classification of an agent, or the type of application environment, although the invention is not limited in this regard.

In an example embodiment, an agent making a memory request may attach or assign a page management indicator characteristic to a memory request(s). Thus, according to the above example embodiments, the page manager, may recognize the page management indicator characteristic and selectively leave the accessed memory page open after memory access, although the invention is not limited in this regard.

Reference in the specification to "one embodiment" or "an embodiment" may mean that a particular feature, structure or characteristic described in connection with the embodiment is included in at least one embodiment of the present invention. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily referring to the same embodiment.

In the following description, for purposes of explanation, numerous specific details are set forth in order to provide a thorough understanding of the invention. It will be apparent, however, to one skilled in the art, that the invention can be practiced without these specific details. In other instances, structures and devices are shown in block diagram form in order to avoid obscuring the invention.

FIG. 1 is a block diagram of an electronic system 100 incorporating the teachings of the present invention, according to but one example embodiment. Electronic system 100 may be, for example, a computer, a Personal Digital Assistant (PDA), a set-top box, a communications device (e.g., cellular telephone, wireless communicator, etc.), or any other electronic system.

In accordance with the illustrated example implementation of FIG. 1, electronic system 100 is depicted comprising communication channel(s) 102, control logic 104, memory 106, I/O interfaces 108, mass storage 110, agent(s) 112, memory controller 114 and at least one page manager(s) 116, each coupled as depicted.

In accordance with one example embodiment of the present invention, control logic 104 may process information and execute instructions to implement various functions/features s offered by electronic system 100. In this regard, according to one embodiment, control logic 104 may well selectively control one or more elements 106–116 to effect such functions/features.

Electronic system 100 further includes memory 106 to store information and instructions to be executed by control logic 104 in support of the functions/features offered by electronic system 100. In this regard, memory 106 may also be used to store temporary variables or other intermediate information during execution of instructions by control logic 104. As used herein, memory 106 may well include one or more volatile memory, non-volatile memory, flash, or other static or dynamic storage media as known in the art.

Agent(s) 112 represent elements of system 100 which may request access to memory 106. As used herein, agent(s) 112 is intended to represent any of a number of hardware and/or software element(s) to request and receive access to memory 106 or one or more other forms of memory (not particularly denoted) communicatively coupled to system 100. In this regard, according to one example implementation, agent(s) 112 may well comprise one or more of a software application, a hardware device driver, a microprocessor, and the like.

In one embodiment, memory request(s) to memory 106 are made by agent(s) 112 communicatively coupled to system 100. As introduced above, and developed more fully below, a memory request(s) for access to memory 106 may be made by agent(s) 112 to memory controller 114. According to one example embodiment, page manager(s) 116 may then determine at least one characteristic of the memory request(s) to memory 106. Page manager(s) 116 may selectively leave open an accessed memory page of memory 106 based, at least in part on the at least one characteristic of the memory request(s) to memory 106, to balance memory access latency and bandwidth.

In an example embodiment, at least a subset of memory requests, to memory 106 may be received from agent(s) 112. Page manger(s) 116 may organize at least a subset of the memory requests to memory 106 in a memory request queue. The queue may be organized as specific to a particular agent, a type of memory request, an application environment or sorted for each bank of memory 106, although the invention is not limited in this regard.

In an example implementation, page manager(s) 116 may compare a memory request to at least a subset of the memory requests organized in the queue. Page manager(s) 116 based, at least in part, on the comparison, may determine at least one characteristic of the memory request. Thus, in an example implementation, page manager(s) 116 may selectively leave a memory page open after a memory access to memory 106 based, at least in part, on the at least one characteristic for the memory request, to balance memory access latency and bandwidth for agent(s) 112 with pending memory requests.

According to one example embodiment, page manager(s) 116 may be encompassed within memory controller 114. Alternatively, page manager(s) 116 may well be communicatively coupled to memory controller 114 through, e.g. communication channel(s) 102 or through I/O interfaces 108.

I/O interfaces 108 enables one or more element(s), e.g., control logic 102, to interact with input and/or output devices. For example, input devices such as a mouse, keyboard, touchpad, etc. and/or output devices such as a cathode ray tube monitor, liquid crystal display, etc. I/O interfaces 108 may also enable other elements e.g., memory controller 114 to access memory external to electronic system 100.

Mass storage 110 is intended to represent any of a number of storage media known in the art including, but not limited to, for example, a magnetic disk or optical disc and its corresponding drive, a memory card, or another device capable of storing machine-readable content.

It should be appreciated that memory controller 114 and/or page manager(s) 116 need not be integrated within electronic system 100 for electronic system 100 to access and benefit from the features of memory controller 114 and/or page manager(s) 116 described herein. That is, as introduced above, I/O interfaces 108 may provide a communications interface between memory controller 114 and/or page manager(s) 116 and an electronic system through, e.g., a network communication channel. Thus, enabling the remote electronic system to access and employ the features of memory controller 114 and/or page manager(s) 116.

According to one example embodiment, the determination of at least one characteristic and the leaving open or closing of memory pages by memory controller 114 and/or page manager(s) 116 may well be implemented in hardware, software, firmware, or any combination thereof. In this regard, memory controller 114 and/or page manager(s) 116 may well be implemented as one or more of an Application Specific Integrated Circuit (ASIC), a special function controller or processor, a Field Programmable Gate Array (FPGA), programmable logic device (PLD) or other hardware device, firmware or software to perform at least the functions described herein.

In an example embodiment, electronic system 100 may be implemented in an I/O controller application environment where large amounts of data with a high correlation to each other are moved between different elements of system 100, such as for example control logic 104 and mass storage 110. In this application environment, high memory access bandwidth may be required and memory page hits are common. Thus, the page manager(s) 116 may determine a memory request characteristic based, at least in part, on receiving memory requests in this type of environment, although the invention is not limited in this regard.

In another example embodiment, electronic system 100 may be implemented in a network application environment where there are a large number of data packets being processed that may have little or no correlation to each other. In this application environment, small packet headers are rapidly processed to maintain high data throughput rates which are possibly required by a communication protocol such as Ethernet, ATM, Voice over IP, etc. In this network environment, reducing memory access latency is important to meet data throughput rate requirements and page misses are common. Thus, the page manager(s) 116 may determine a memory request characteristic based, at least in part, on receiving memory requests in this type of environment, although the invention is not limited in this regard.

In accordance with another example embodiment, electronic system 100 may be implemented in an application environment where there is a mixture of reduced latency and increased bandwidth requirements depending on which agent requests memory access or the type of memory request. In this environment, page manager(s) 116 may determine a memory request characteristic based, at least in part, on receiving memory requests in this type of environment, although the invention is not limited in this regard.

In an example implementation, memory controller 114 and/or page manager(s) 116 receive memory requests from agent(s) 112. Agent(s) 112 may include an IDE device controller that is communicating to a storage system such as mass storage 110, an Ethernet controller and a RISC microprocessor that is servicing exceptions and running higher-level applications. The IDE device controller, since leaving a memory page open after memory access may increase memory bandwidth, may attach a page management indicator to indicate leaving the memory page open after memory access. The Ethernet controller, since closing a memory page after memory request(s) may reduce memory access latency, may attach a page management indicator to indicate the closing of the memory page after memory access. The RISC microcontroller may be running a high level application or doing exception processing. For running a high level application, increased memory bandwidth is important, thus, the RISC microcontroller may attach a page management indicator to leave open a memory page after memory access. Meanwhile, for doing exception processing, reduced memory access latency is preferred. Thus, the RISC microcontroller may attach a page management indicator to close a memory page after memory access.

Although shown as a number of disparate functional elements, those skilled in the art will appreciate from the disclosure herein, that memory controllers and/or page managers of greater or lesser complexity that nonetheless perform the functions/features described herein, whether implemented in hardware, software, firmware or a combination thereof, are anticipated within the scope and spirit of the present invention.

Figure 2:
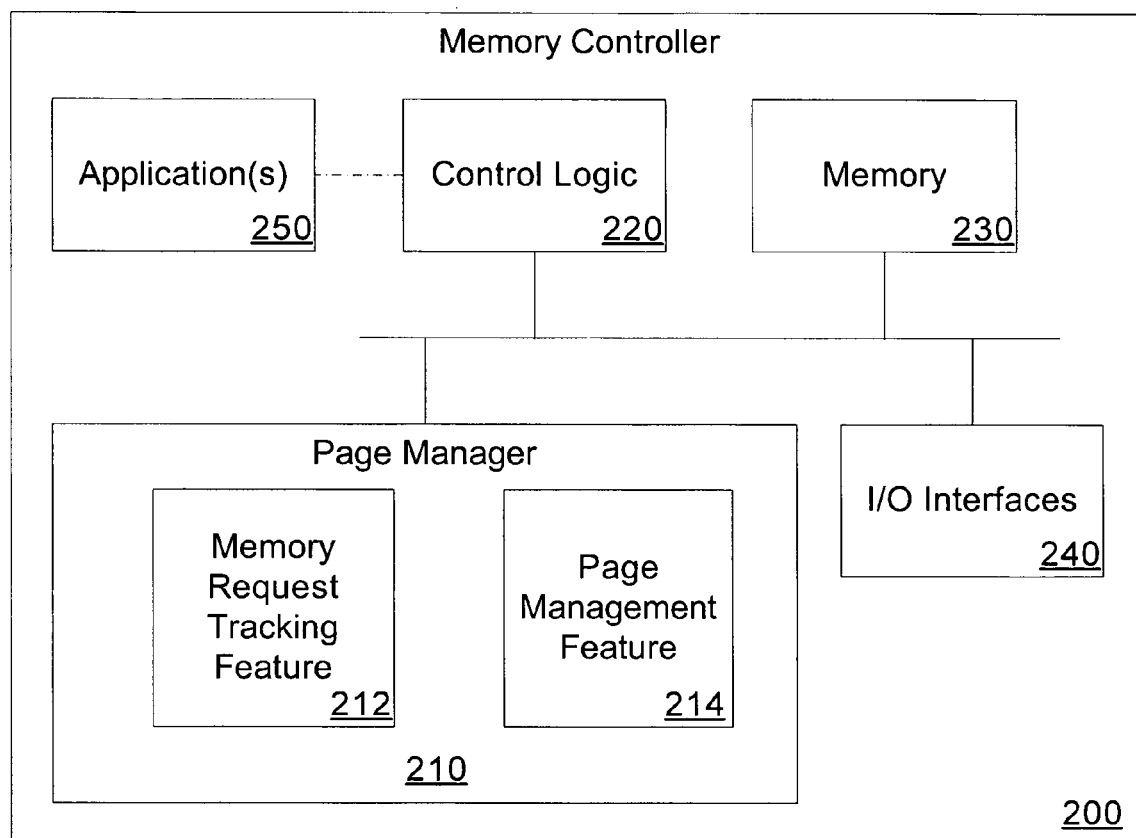
FIG. 2 is an architectural diagram of an example memory controller, according to one example embodiment of the present invention.

FIG. 2 is an architectural diagram of an example memory controller, according to one example embodiment of the present invention. In accordance with the illustrated example implementation of FIG. 2, memory controller 200 is depicted comprising one or more of a page manager 210, control logic 220, memory 230, I/O interfaces 240, and optionally, one or more application(s) 250, each coupled as depicted. In one example embodiment, page manager 210 may well be used in electronic system 100 as page manager(s) 116.

As used herein, control logic 220 may control the overall operation of memory controller 200 and is intended to represent any of a wide variety of logic device(s) and/or content which coordinates the overall operation of memory controller 200. In this regard, control logic 220 may well be comprised of a microprocessor, microcontroller, field-programmable gate array (FPGA), application specific integrated circuit (ASIC), executable content to implement such control features and/or any combination thereof. In alternate embodiments, the features and functionality of control logic 220 may well be implemented within page manager 210.

According to one example embodiment, control logic 220 may selectively invoke an instance of page manager 210 to determine at least one characteristic of a memory request or at least a subset of memory requests. Page manager 210 may then selectively leave an accessed memory page open after a memory access based, at least in part, on the at least one characteristic.

In accordance with one example embodiment of the present invention, page manager 210 is depicted comprising one or more of a memory request tracking feature 212 and page management feature 214.

As developed more fully below, memory request tracking feature 212 tracks at least a subset of pending memory requests.

As developed more fully below, page management feature 214 determines at least one characteristic from at least a subset of received memory requests. Page management feature 214 may then selectively leave the accessed memory page open based, at least in part, on the determined at least one characteristic to balance memory access latency and bandwidth of subsequent memory requests.

In accordance with one example implementation, memory controller 200 receives a memory request for memory access, e.g. from agent(s) 112. In response to control logic 220, page manager 210 selectively invokes an instance of page management feature 214 to selectively leave an accessed memory page open after memory access. As introduced above and explained in more detail below, this may well be done in a way that balances memory access latency and bandwidth.

As used herein, memory 230 is similarly intended to represent a wide variety of memory media including, but not limited to, volatile memory, non-volatile memory, flash and programmatic variables or states. According to one example implementation, memory 230 is used by page manager 210 to temporarily store a pending memory request table, e.g., generated by memory request tracking feature 212. In this regard, memory 230 may well include a pending memory request table with one or more entries for placing at least a subset of pending memory requests.

According to one example embodiment, upon receiving a memory request, page manager 210 invokes an instance of memory request tracking feature 212 to generate a temporary pending memory request table, e.g., maintained in memory 230. According to one example implementation, memory request tracking feature 212 generates a temporary pending memory request table by populating the temporary pending memory request table with a listing of at least a subset of pending memory requests. The listing of pending memory requests may be organized as specific to a particular agent, type of memory request, or an application environment, although the invention is not limited in this regard.

Page manager 210 then may invoke an instance of page management feature 214 to determine the characteristics of the memory request by comparing the memory request to at least a subset of pending memory requests in the temporary pending memory request table, generated by memory request tracking feature 212.

Page management feature 214 may determine memory request characteristics based, at least in part, on the spatial and temporal locality characteristics of multiple memory requests, the types of memory requests, or the agents making memory requests.

Page management feature 214 may also utilize the temporary pending memory request table to determine at least one characteristic for a memory request, based, at least in part, on an arbitration scheme, although the invention is not limited in this regard. The arbitration scheme, for example, may assign priorities to a particular agent, type of memory request or application environment. These priorities, for example, may be based, at least in part, on such criteria as fairness, quality of service (QOS) or multi-level priorities based, at least in part, on a combination of fairness and/or QOS and/or other criteria, although the invention is not limited in this regard.

Thus, in an example implementation, page management feature 214 may utilize a temporary pending memory request table, generated by memory request tracking feature 212, to determine a memory request characteristic. Based, at least in part, on the determined memory request characteristic, page management feature 214 may selectively leave a memory page open after a memory access to balance memory access latency and bandwidth for memory requests from among various memory request types, agents or application environments.

As used herein, I/O interfaces 240 provide a communications interface between memory controller 200 and an electronic system. For example, memory controller 200 may be implemented as an element of a computer system, wherein I/O interfaces 240 provide a communications interface between memory controller 200 and the computer system via a communication channel. In this regard, control logic 220 can receive a series of instructions from application software external to memory controller 200 via I/O interface(s) 240.

In an example embodiment, memory controller 200 may include one or more application(s) 250 to provide internal instructions to control logic 220. As used herein, application(s) 250 may well be invoked to generate a user interface, e.g., a graphical user interface (GUI), to enable administrative features, and the like. In alternate embodiments, one or more features of page manager 210 may well be implemented as an application(s) 250, selectively invoked by control logic 220 to invoke such features. To the extent that they are not used to implement one or more features of the present invention application(s) 250 are not necessary to the function of memory controller 200.

It should be appreciated that memory controller 200 need not be integrated within an electronic system for the electronic system to access and benefit from the features of memory controller 200 described herein. That is, as introduced above, I/O interfaces 240 may provide a communications interface between memory controller 200 and an electronic system through, e.g., a network communication channel, enabling the remote electronic system to access and employ the features of memory controller 200.

Figure 3:
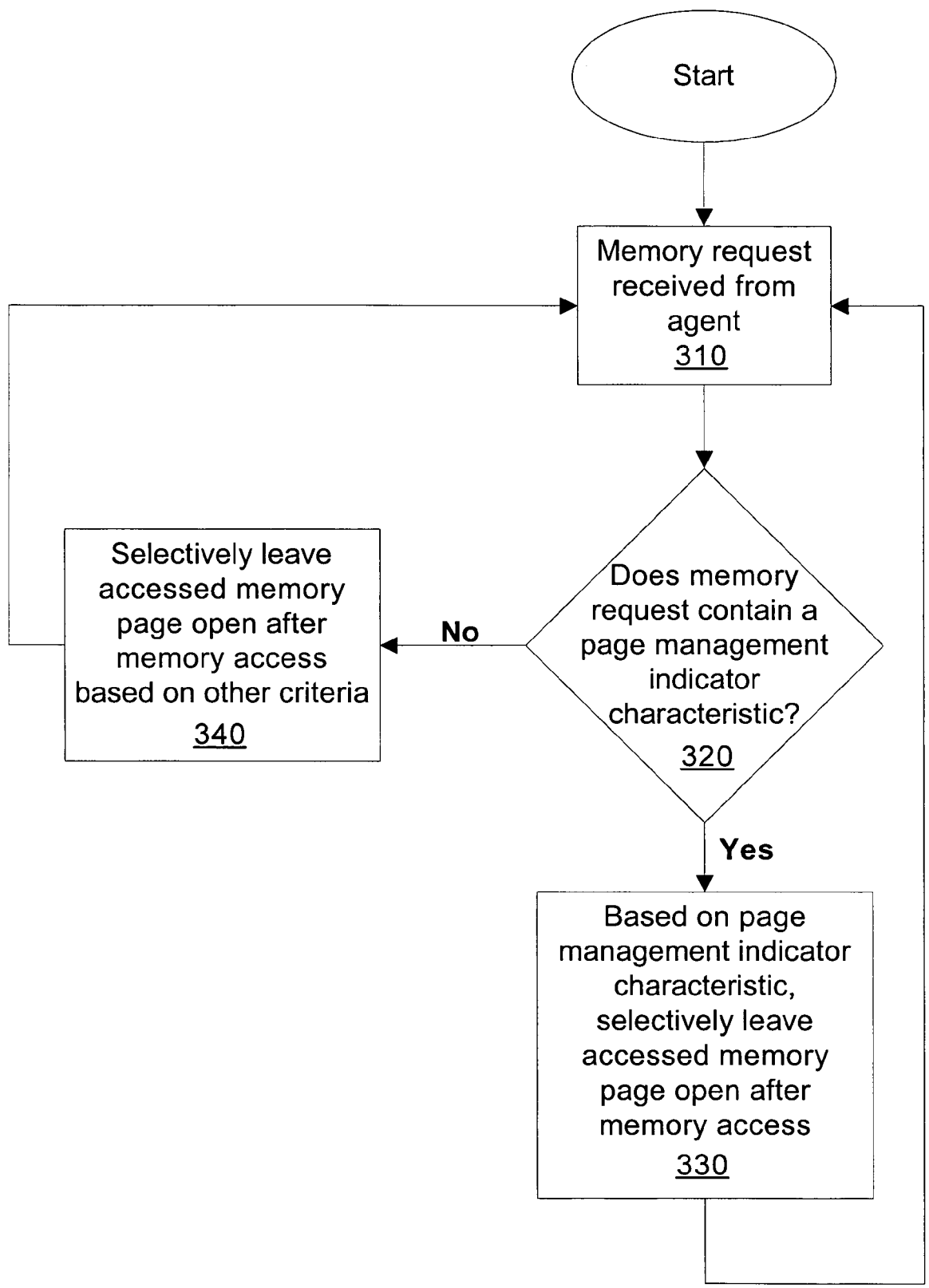
FIG. 3 is a flow chart of an example method of balancing memory access latency and bandwidth, in accordance with the teachings of the present invention, according to one example embodiment.

FIG. 3 is a flow chart of an example method of balancing memory access latency and bandwidth in accordance with the teachings of the present invention, according to one example embodiment. In the illustrated embodiment of FIG. 3, the process begins with block 310 wherein memory controller 200 receives a memory request from agent(s) 112.

Once the request is received, the process moves to block 320 wherein control logic 220 invokes an instance of page manager 210. According to one example implementation, in response to control logic 220, page manager 210 selectively invokes an instance of page management feature 214. Page management feature 214 may determine whether the memory request contains a page management indicator characteristic, based, at least in part, on the page management indicator characteristic, page management feature 214 may selectively leave an accessed memory page open after memory access.

In an example embodiment, a page management indicator characteristic for a memory request may be statically determined, i.e. at time of start-up. This may occur for example, when memory requests are expected or known for either the type of application environment electronic system 100 is implemented in, to a particular agent(s), or a type of memory request expected to be received by agent(s) 112.

In an example implementation, page management feature 214 may statically determine a page management indicator characteristic based, at least in part, on memory requests for agent(s) 112 expected to make instruction type memory requests. Since instruction type memory requests may require a memory access where data is highly correlated, i.e. on the same memory page, the page management indicator characteristic may result in page management feature 214 leaving an accessed memory page open after memory access to increase memory access bandwidth.

In another example implementation, page management feature 214 may statically determine a page management indicator characteristic based, at least in part, on memory requests for agent(s) 112 expected to make data type memory requests. Since data type memory requests may require a memory access where data is not highly correlated, i.e. on different memory pages, the page management indicator characteristic may result in page management feature 214 closing an accessed memory page after memory access to reduce memory access latency.

In an alternative embodiment, agent(s) 112 may assign or attach a page management indicator characteristic to the memory request as an indication to page management feature 214 to selectively leave an accessed memory page open after a memory access.

If the received memory request contains a page management indicator characteristic to selectively leave the accessed memory page open after memory access, e.g. as described above, the process continues with block 330, wherein based on the page management indicator characteristic, page management feature 214 selectively leaves the accessed memory page open after memory access and the process then returns to block 310. Alternatively, if the memory request does not contain a page management indicator characteristic, the process moves to block 340, wherein page management feature 214 selectively leaves the accessed memory page open after memory access based on other criteria, and process returns to block 310.

Figure 4:
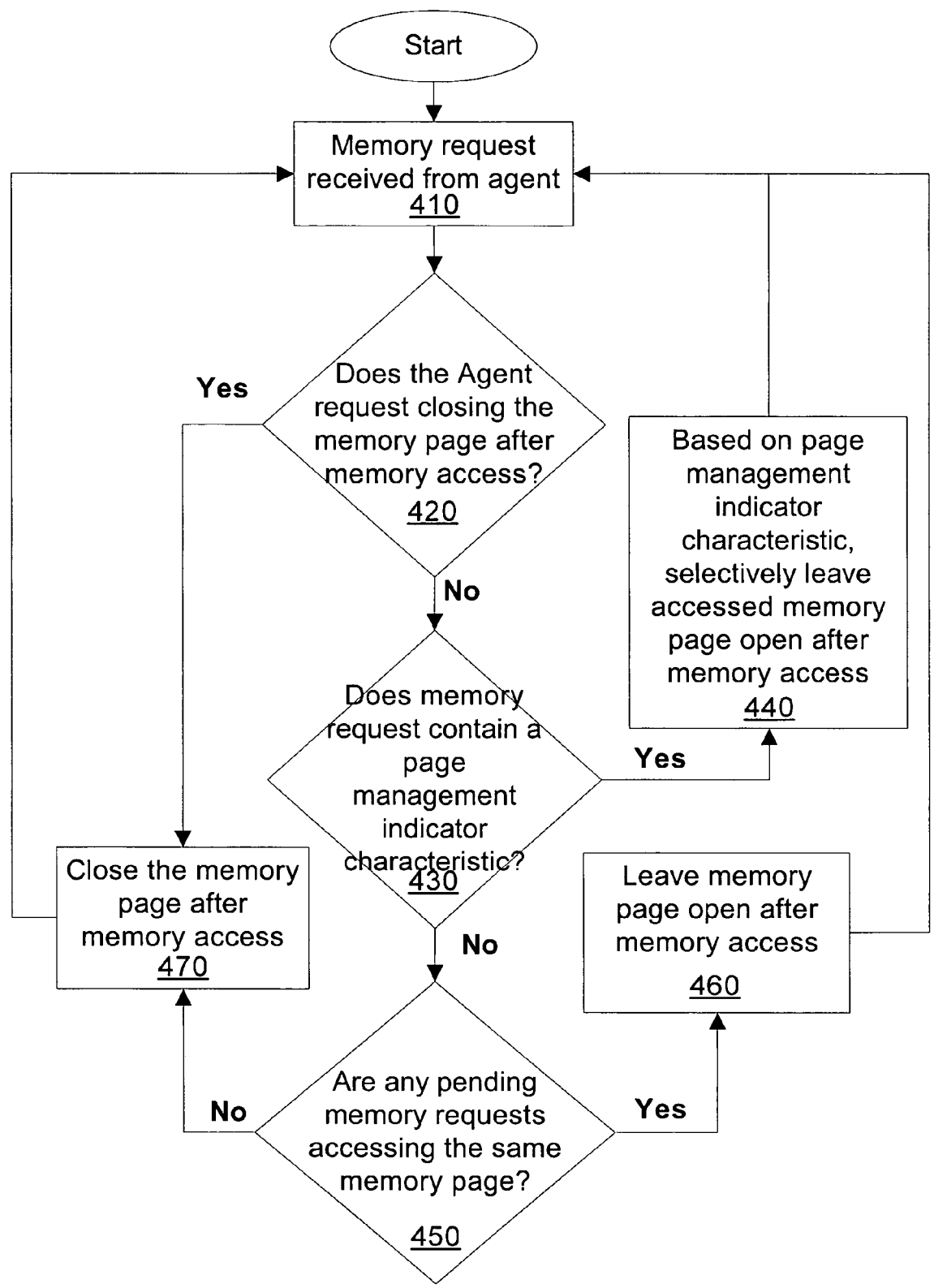
FIG. 4 is a flow chart of an example method of dynamically balancing memory access latency and bandwidth in accordance with the teachings of the present invention, according to one example embodiment.

FIG. 4 is a flow chart of an example method of dynamically balancing memory access latency and bandwidth in accordance with the teachings of the present invention, according to one example embodiment. In the illustrated embodiment of FIG. 4, the process begins with block 410 wherein a memory request is received by memory controller 200 from agent(s) 112.

Once the memory request is received, the process moves to block 420 wherein control logic 220 invokes an instance of page manager 210. According to one example implementation, in response to control logic 220, page manager 210 selectively invokes an instance of page management feature 214. Page management feature 214 determines whether the agent has requested the closing of the memory page after memory access.

If the agent is requesting closing of the memory page after memory access, the process continues with block 470, wherein page management feature 214 closes the memory page after memory access and the process returns to block 410.

If the agent does not request the closing of the memory page after memory access, the process moves to block 430, wherein, as introduced above, page management feature 214 determines whether the received memory request contains a page management indicator characteristic to selectively leave an accessed memory page open after memory access. If the received memory request is determined to contain a page management indicator characteristic, as explained above, the process continues with block 440.

In block 440, based on the page management indicator characteristic, page management feature 214 selectively leaves the accessed memory page open after memory access and the process returns to block 410. Alternatively, if the memory request is determined not contain a page management indicator characteristic, the process moves to block 450.

In block 450, according to one example implementation, in response to control logic 220, page manager 210 selectively invokes an instance of memory request tracking feature 212. Memory request tracking feature 212 populates a temporary pending memory request table in memory 230 from at least a subset of pending memory requests to memory 106, for example, pending memory requests from agent(s) 112.

Once a temporary pending memory request table is populated by memory request tracking feature 212, page management feature 214 then determines the characteristic of a memory request by comparing the memory request to at least a subset of pending memory requests in the temporary pending memory request table. Thus, in an example implementation, if the memory request is to the same memory page as at least one of the pending memory requests, page management feature 214 determines that the memory request has a high spatial and temporal locality characteristic. Therefore, based, at least in part, on a high spatial and temporal locality characteristic, subsequent memory requests may be balanced to reduce memory access latency and possibly increase memory access bandwidth, and the process continues with block 460.

In block 460, page management feature 214 leaves the accessed memory page open after memory access. The process then returns to block 410.

Alternatively, if the memory request is not to the same memory page as at least one of the pending memory requests, page management feature 214 determines that the memory request has a low spatial and temporal locality characteristic. Therefore, based, at least in part, on a low spatial and temporal locality characteristic, subsequent memory requests may be balanced to reduce memory access latency and possibly decrease memory access bandwidth, and the process continues with block 470.

In block 470, page management feature 214 closes the memory page after memory access and process returns to block 410.

In accordance with one example embodiment, machine-readable instructions can be provided to memory 106 from a form of machine-accessible medium. As used herein, a machine-accessible medium is intended to represent any mechanism that provides (i.e., stores and/or transmits) information in a form readable by a machine (e.g., a electronic system 100). For example, a machine-accessible medium may well include a computer readable medium including: read only memory (ROM); random access memory (RAM); magnetic disk storage media; optical storage media; flash memory devices; and communication media consisting of electrical, optical, acoustical or other form of propagated signals (e.g., carrier waves, infrared signals, digital signals); and the like. Instructions may also be provided to memory 106 via a remote connection (e.g., over a network).

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative of, rather than limiting the scope and coverage of the claims appended hereto.

What is claimed is:

1. A method comprising:
   determining a characteristic of a memory request based on a page management indicator associated with the memory request; and
   selectively leaving an accessed memory page open after a memory access based, at least in part, on the characteristic of the memory request.

2. A method according to claim 1, further comprising:
   determining another characteristic of the memory request based on a spatial locality for the memory request as compared to at least a subset of pending memory requests, the spatial locality determined based on whether the memory request, as compared to the at least a subset of pending memory requests, is to a same memory page as the at least a subset of pending memory requests.

3. A method according to claim 2, wherein the accessed memory page is left open after the memory access if the memory request, as compared to the at least a subset of memory requests, is to the same memory page.

4. A method according to claim 2, wherein the accessed memory page is closed after the memory access if the memory request, as compared to the at least a subset of memory requests, is to a different memory page.

5. A method according to claim 1, wherein the page management indicator indicates a type of memory request associated with an agent making the memory request.

6. A method according to claim 5, wherein the page management indicator to indicate the type of memory request associated with the agent making the memory request comprises the page management indicator to indicate the type of memory request is an instruction memory request.

7. A method according to claim 6, wherein the accessed memory page is left open after the memory access.

8. A method according to claim 5, wherein the page management indicator to indicate the type of memory request associated with the agent making the memory request comprises the page management indicator to indicate the type of memory request is a data memory request.

9. A method according to claim 8, wherein the accessed memory page is closed after the memory access.

10. A method according to claim 1, further comprising:
    determining another characteristic of the memory request based on an arbitration scheme.

11. A method according to claim 10, wherein the arbitration scheme is based, at least in part, on a priority associated with the memory request.

12. A method according to claim 11, wherein the priority associated with the memory request is based, at least in part, on fairness.

13. A method according to claim 11, wherein the priority associated with the memory request is based, at least in part, on quality of service.

14. A method according to claim 1, wherein a memory controller receives the memory request.

15. An apparatus comprising:
    a memory controller coupled with a plurality of memory pages, the memory controller to selectively leave an accessed memory page open after a memory access based, at least in part, on a characteristic of a memory request, the characteristic determined based on a page management indicator associated with the memory request.

16. An apparatus according to claim 15, the apparatus further comprising a memory to store content, at least a subset of which is executable content; and
    a control logic, coupled with the memory, to selectively execute at least a subset of the executable content, to implement an instance of the memory controller.

17. An apparatus according to claim 15, wherein the plurality of memory pages is associated with physical elements of synchronous dynamic random access memory.

18. An apparatus according to claim 15, wherein the page management indicator indicates a type of memory request associated with an agent making the memory request, the type of memory request to include one of an instruction memory request or a data memory request, the memory controller to leave an accessed memory page open after the memory access if the page management indicator indicates the type of memory request is an instruction memory request and the memory controller to close an accessed memory page after the memory access if the page management indicator indicates the type of memory request is a data memory request.

19. An apparatus according to claim 15, wherein the memory controller to selectively leave the accessed memory page open after the memory access comprises the memory controller to selectively leave the accessed memory page open after the memory access based, at least in part, on another characteristic of the memory request, the other characteristic to include a spatial locality for the memory request as compared to at least a subset of pending memory requests, the spatial locality determined based on whether the at a least subset of pending memory requests are to a same memory page as the memory request, wherein the memory controller is to leave open the accessed memory page after the memory access if the memory request is to the same memory page.

20. A memory controller comprising:
    a page manager coupled with a plurality of memory pages, the page manager to selectively leave an accessed memory page open after a memory access based on a characteristic of the memory request, the characteristic determined based on a page management indicator associated with the memory request.

21. A memory controller according to claim 20, wherein the page management indicator indicates the type of memory request associated with an agent making the memory request, the type of memory request to include one of an instruction memory request or a data memory request, the page manager to cause the accessed memory page to remain open after the memory access if the page management indicator indicates the type of memory request is an instruction memory request and the page manager to cause the accessed memory page to close after the memory access if the page management indicator indicates a data memory request.

22. A memory controller according to claim 20, wherein the page manager to selectively leave the accessed memory page open after the memory access comprises the page manager to selectively leave the accessed memory page open after the memory access based, at least in part, on another characteristic of the memory request, the other characteristic to include a spatial locality for the memory request as compared to at least a subset of pending memory requests, the spatial locality determined based on whether the at least subset of pending memory requests are to a same memory page as the memory request, wherein the page manager is to cause the accessed memory page is remain open after the memory access if the memory request is to the same memory page.

23. A system comprising:
   volatile memory associated with a plurality of memory pages; and
   a memory controller including a page manager, the page manager coupled with the volatile memory to selectively leave an accessed memory page open after a memory access based, at least in part, on a characteristic of the memory request, the characteristic based on a page management indicator associated with the memory request.

24. A system according to claim 23, wherein the page management indicator indicates the type of memory request associated with the agent making the memory request, the type of memory request to include one of an instruction memory request or a data memory request, the page manager to cause the accessed memory page to remain open after the memory access if the page management indicator indicates the type of memory request is an instruction memory request and the page manager to cause the accessed memory page to close after the memory request if the page management indicator indicates a data memory request.

25. A system according to claim 23, wherein the page manager to selectively leave the accessed memory page open after the memory access comprises, the page manager to selectively leave the accessed memory page open after the memory access based on another characteristic of the memory request, the other characteristic to include a spatial locality for the memory request as compared to at least a subset of pending memory requests, the spatial locality determined based on whether the at least at a subset of pending memory requests are to a same memory page as the memory request, wherein the page manager is to cause the accessed memory page to remain open after the memory request if the memory request is to the same memory page and the page manager to cause the accessed memory page to close after the memory request if the memory request is to a different memory page.

26. A system according to claim 23, wherein the page manager to selectively leave the accessed memory page open after the memory access comprises, the page manager to selectively leave the accessed memory page open after the memory access based on another characteristic of the memory request, the other characteristic to include an arbitration scheme.

27. A system according to claim 26, wherein the arbitration scheme is based, at least in part, on a priority associated with the memory request.

28. A system according to claim 27, wherein the priority associated with the memory request is based, at least in part, on fairness.

29. A system according to claim 27, wherein the priority associated with the memory request is based, at least in part, on quality of service.

30. A system according to claim 23, wherein the volatile memory is synchronous dynamic random access memory.

31. A computer readable medium comprising content, when executed by a machine, causes the machine to determine a characteristic of a memory request based on a page management indicator associated with the memory request; and selectively leave an accessed memory page open after a memory access based, at least in part, on the characteristic of the memory request.

32. A computer readable medium according to claim 31, wherein the page management indicator indicated a type of memory request associated with an agent making the memory request, the type of memory request to include one of an instruction memory request or a data memory request, the memory page to remain open after the memory access if the page management indicator indicated an instruction memory request and the memory page to close after the memory access if the page management indicator indicates a data memory request.

33. A computer readable medium according to claim 31, further comprising the machine to: determine another characteristics of the memory request based on a spatial locality for the memory request, as compared to at least a subset of pending memory requests, the spatial locality determined based on whether the memory request, as compared to the at least a subset of pending memory requests is to a same memory page as the at least a subset of pending memory requests.

34. A computer readable medium according to claim 31, further comprising the machine to: determine another characteristic of the memory request based on an arbitration scheme.

35. A computer readable medium according to claim 34, wherein the arbitration scheme is based, at least in part, on a priority associated with the memory request.

36. A computer readable medium according to claim 35, wherein the priority associated with the memory request is based, at least in part, on fairness.

37. A computer readable medium according to claim 35, wherein the priority associated with the memory request is based, at least in part, on quality of service.

38. A system comprising:
   a plurality of agents;
   a memory controller coupled to the agents, the memory controller to use different memory page modes for accessing one or more memory pages based on a characteristic of a memory request received from one or more respective agents, the characteristic determined based on a page management indicator associated with the memory request received from the one or more respective agents.

39. A system according to claim 38, wherein the different memory page modes include a memory page mode to leave the one or more memory pages open after a memory access and a memory page mode to close the one or more memory pages after a memory access.

40. A system according to claim 39, wherein the page management indicator associated with the memory request is attached to the memory request by the one or more respective agents, the page management indicator to indicate to the memory controller which memory page mode to use.

* * * * *